United States Patent
Hwang et al.

(10) Patent No.: US 6,274,953 B1
(45) Date of Patent: Aug. 14, 2001

(54) SYSTEM FOR PREVENTING MALFUNCTION OF A SWITCHING CIRCUIT FOR LINEAR MOTOR

(75) Inventors: Ji Hyun Hwang; Do Hyun Kim; Hyun Joo Hwang, all of Kyungki-do; Jang Sung Chun, Seoul, all of (KR)

(73) Assignee: Mirae Corporation, Choongchungnam-Do (KR)

( * ) Notice: Subject to any disclaimer, the term of this patent is extended or adjusted under 35 U.S.C. 154(b) by 0 days.

(21) Appl. No.: 09/544,448

(22) Filed: Apr. 7, 2000

(30) Foreign Application Priority Data

Jun. 24, 1999 (KR) .................................. 99-23972

(51) Int. Cl.[7] ...................................................... H02K 41/00
(52) U.S. Cl. .............................................................. 310/12
(58) Field of Search ................................ 310/12, 13, 14, 310/68 B

(56) References Cited

U.S. PATENT DOCUMENTS 5,864,192 * 1/1999 Nagate et al. ........................ 310/156

* cited by examiner

*Primary Examiner*—Elvin Enad
*Assistant Examiner*—Judson H. Jones
(74) *Attorney, Agent, or Firm*—Rosenberg, Klein & Lee

(57) ABSTRACT

There is disclosed a system for preventing malfunction of a switching circuit for a linear motor capable of preventing malfunction of the switching circuit due to magnet flux from the permanent magnet mounted on the movable element, the system including sensing magnets provided at a longitudinal one side of a movable element having a plurality of permanent magnets mounted thereon, a plurality of Hall sensors mounted on the stator element and used for controlling current flow into a plurality of armature coils by turning on/off a switching circuit, based upon the sensing of magnet flux generated from the sensing magnets, and dummy sensing magnet provided at one side end of the sensing magnet in such a manner that its polarity is opposite to that of the sensing magnet, and for preventing magnets flux generated from the plural permanent magnets from introducing into the plural Hall sensors.

3 Claims, 3 Drawing Sheets

SYSTEM FOR PREVENTING MALFUNCTION OF A SWITCHING CIRCUIT FOR LINEAR MOTOR

BACKGROUND OF THE INVENTION

1. Field of the Invention

The present invention relates to a system for preventing malfunction of a switching circuit for a linear motor, and more particularly to a system for preventing malfunction of a switching circuit for a linear motor capable of preventing malfunction of the switching circuit due to magnet flux generated from permanent magnets mounted on a movable element.

2. Description of the Conventional Art

Linear motors are, generally, used in accurate transfer control of objects, such as machining tools, industrial robots, etc.

A conventional linear motor, shown in FIGS. 1 and 2, is comprised of a stator element 1 and a movable element 2. The stator element 1 has plural armature coils 3 arranged in a longitudinal direction of the stator element 1, and the movable element 2 has a plurality of permanent magnets 4 provided opposing to the plural armature coils 3. A plurality of permanent magnets 4 disposed to face the plural armature coils 3 are arranged to have their polarities of N pole and S poles separated to each other.

When electric current flows to the plural armature coils 3, the linear motor generates a thrust allowing the movable element 2 to be moved, by Fleming☐s left-hand rule. To create such a thrust able to move the movable element 2, the current flows into the armature coil 3 should be controlled. At this time, the current flowing into the armature coil 3 may be controlled using plural Hall sensors 6 mounted on the stator element 1.

On the other hand, the plural Hall sensors 6 output a constant level of voltage when the sensors 6 sense magnetic flux created from the sensing magnet 5 mounted on the movable element 2. The output voltage is used for controlling switches (not shown) employed to control the current flows into the armature coils 3. With the controlled current flows into the armature coils 3 by the turning ON/OFF of the switches, the thrust for moving the movable element 2 can be generated.

While the use of the sensing magnets coupled to the movable element 2 are needed to control the ON/OFF of the switches, malfunction of a switching circuit may occur due to relatively stronger intensity of magnet flux generated from the permanent magnets of the movable element 2.

To prevent such an occurrence, a dummy magnet (not shown), independently of the generation of the thrust, mounted on both sides of the movable element 2, is employed to prevent malfunction of the switching circuit 20 which may be caused by the magnet flux from the permanent magnet 4. In case such a dummy magnet is used so as to prevent abnormal operation of the Hall sensor 6, the weight of the movable element 2 increases, which requires to design the linear motor capable of producing higher thrust.

SUMMARY OF THE INVENTION

Such problems are solved by this invention having an object of providing a system for preventing malfunction of a switching circuit for a linear motor having a stator element and a movable element, the motor comprising sensing magnets provided at a longitudinal one side of a movable element having a plurality of permanent magnets mounted thereon, a plurality of Hall sensors mounted on the stator element and used for controlling current flow into a plurality of armature coils by turning on/off a switching circuit, based upon the sensing of magnet flux generated from the sensing magnets, and dummy sensing magnet provided at one side end of the sensing magnet in such a manner that its polarity is opposite to that of the sensing magnet, and for preventing magnets flux generated from the plural permanent magnets from introducing into the plural Hall sensors.

DETAILED DESCRIPTION OF THE INVENTION (Embodiment)

Figure 3:
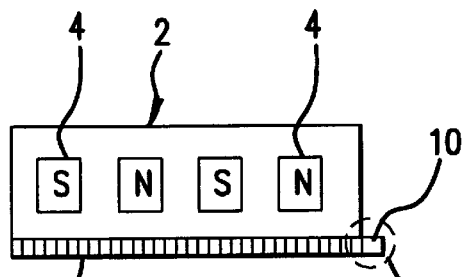
FIG. 3 is a plane view showing a configuration of a sensing magnet for a linear motor according to the present invention.
Figure 3A:
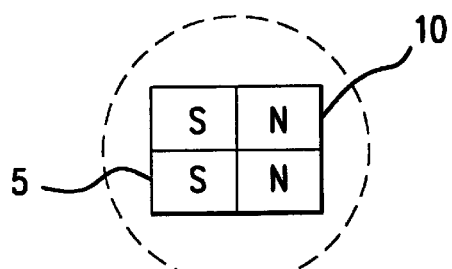

Malfunction preventing system of a switching circuit for a linear motor according to the present invention will be described below, with reference to the accompanying drawings. FIG. 3 is a plan view showing a configuration of a sensing magnet for a linear motor according to the present invention, and FIG. 4 is a circuit diagram of a switching circuit for a linear motor according to the present invention.

Figure 1:
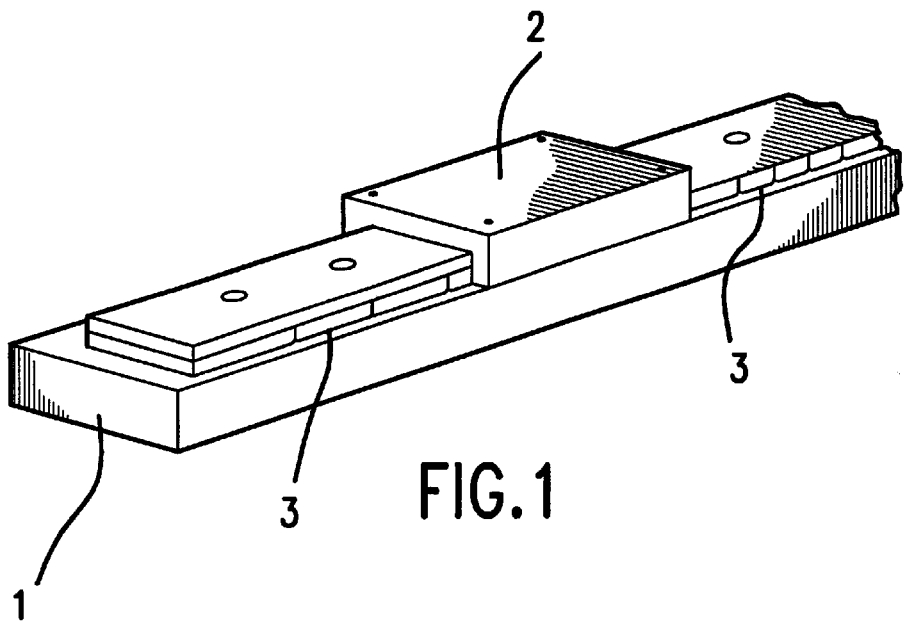
FIG. 1 is a perspective view showing a configuration of a conventional linear motor.
Figure 2:
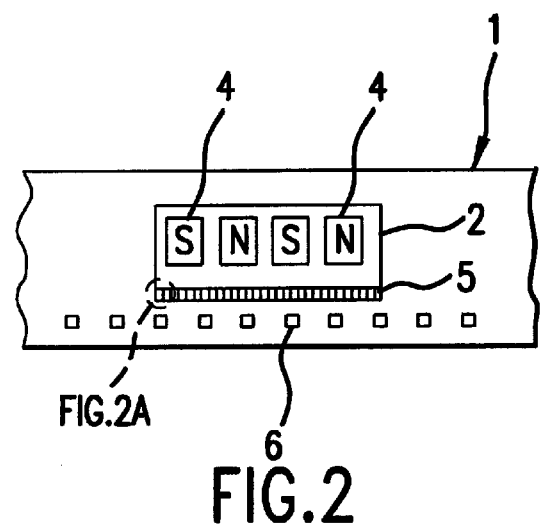
FIG. 2 is a plane view of the linear motor shown in FIG. 1.
Figure 2A:
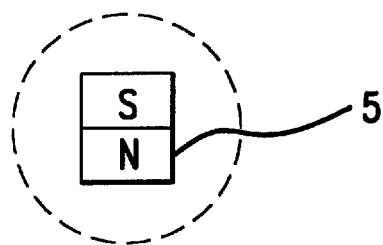
Figure 4:
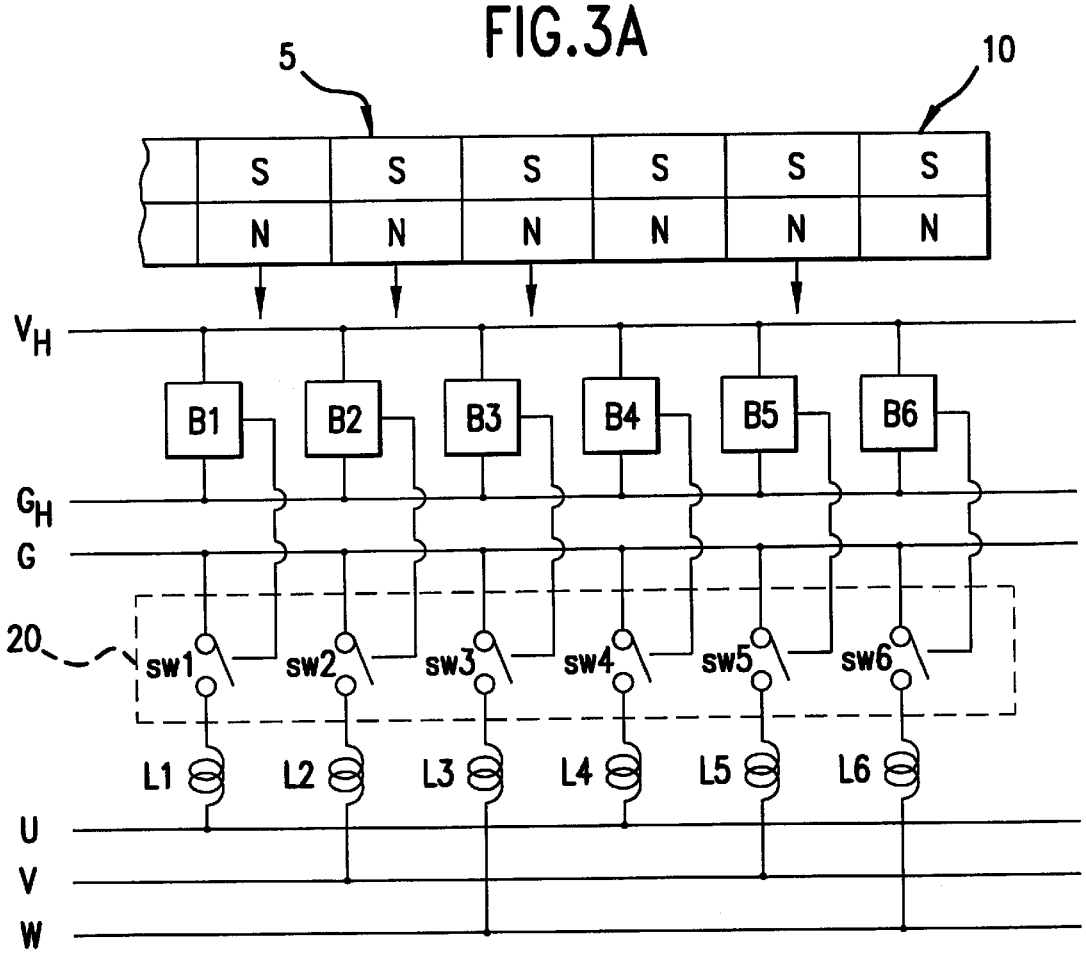
FIG. 4 is a circuit diagram of a switching circuit for a linear motor according to the present invention.

As shown in FIGS. 3 and 4, it is comprised of: plural sensing magnets 5 provided at a longitudinal one side of a movable element 2 having a plurality of permanent magnets 3 mounted thereon; a plurality of Hall sensors H1 to H6 mounted on a stator element 1 (see FIG. 1) and used for controlling current flow into a plurality of armature coils L1 to L6 by turning on/off the switching circuit 20 based upon the sensing of magnet flux generated from the sensing magnets 5; and dummy sensing magnet 10 provided at one side end of the sensing magnet 5 in such a manner that its polarity is opposite to that of the sensing magnet 5, and for preventing magnets flux generated from the plural permanent magnets 5 from introducing into the plural Hall sensors H1 to H6.

The sensing magnets 5 are arranged in a longitudinal direction of the movable element 2, and have their S-poles towards inside of the movable element 2 and their N-poles facing the plural Hall sensors H1 to H6 installed at the stator 2.

The sensing magnets 5, disposed to face the plural Hall sensors H1 to H6, generates magnet flux which is to be sensed by the plural Hall sensors H1 to H6. When the Hall sensors H1 to H6 sense the magnet flux generated from the sensing magnets 5, the sensors output a constant certain level of voltage by which the plural switches SW1 to SW6 of the switching circuit 20 are controllably turned on/off. That is, upon receipt of a constant level of voltage $V_H$, the plural Hall sensors H1 to H6 can control the turing on/off of the switching circuit 20 coupled to the plural armature coils L1 to L6 which are connected the power supplies U, V, W. It is noted that reference symbol $G_H$ denotes a common ground line for the Hall sensors, and reference symbol G denotes a common ground line for the switching circuit 20.

Among first to sixth Hall sensors H1 to H6 constituting the plural Hall sensors H1 to H6, the sixth Hall sensor H6 may sense magnet flux, and then a sixth switch SW6 associated therewith, among first to sixth switches SW1 to SW6 of the switching circuit 20, becomes closed.

When the sixth switch SW6 is closed, the electric current then flows into the armature coil L6 coupled to the power supply W. A thrust from the permanent magnet 4 facing the associated armature coil L6 is allowed to be generated by the generated magnet flux, and then permits the movement of the movable element 2.

At this time, the plural permanent magnets 4 provided at the movable element 2 intended to conduct a linear movement on the stator 1 generates stronger and higher intensity of magnet flux than that from the sensing magnet 5. This makes magnet flux generated from the permanent magnets 4 introduced to the plural Hall sensors H1 to H6, thus resulting in malfunction of the switching circuit 20 by such plural Hall sensors H1 to H6. To prevent this, the dummy sensing magnet 10 is provided so as to suppress an effect of magnet flux generated from the permanent magnet 4.

On the other hand, the dummy sensing magnet 10 having S- and N-poles is installed in the extension of one side end of the sensing magnet 5.

A single dummy sensing magnet 10 is employed in accordance with one embodiment of the present invention, but at least one or more dummy magnets 10 may be used which are to be coupled to one side end of the sensing magnet 5 by one S-pole and N-pole of the dummy magnet 10.

In order to prevent magnet flux generated from the permanent magnet 4, the provision of the dummy sensing magnet 10 is such that the polarity of the dummy magnet 10 is opposite to that of the sensing magnet 5, so that the flow direction of magnet flux from the permanent magnet can be changed. In other words, the arrangement of the dummy sensing magnet facing the Hall elements H1 to H6 makes it possible the prevention of the magnet flux flow into surfaces of the Hall elements H1 to H6.

To effect the prevention of the magnet flux flow into surface of the Hall elements H1 to H6, the dummy sensing magnet 10 is arranged with the polarity identical to that of the permanent magnet 4 such that the magnet flux flow into the surfaces of the Hall elements H1 to H6 is blocked. As a result, malfunction of the Hall elements H1 to H6 can be prevented.

Further, with the use of the dummy sensing magnet 10 allowing malfunction of the Hall elements H1 to H6 to be prevented, malfunction of the plural switches SW1 to SW6 of the switching circuit 20 which is controlled by the Hall elements H1 to H6 can be prevented.

Figure 5:
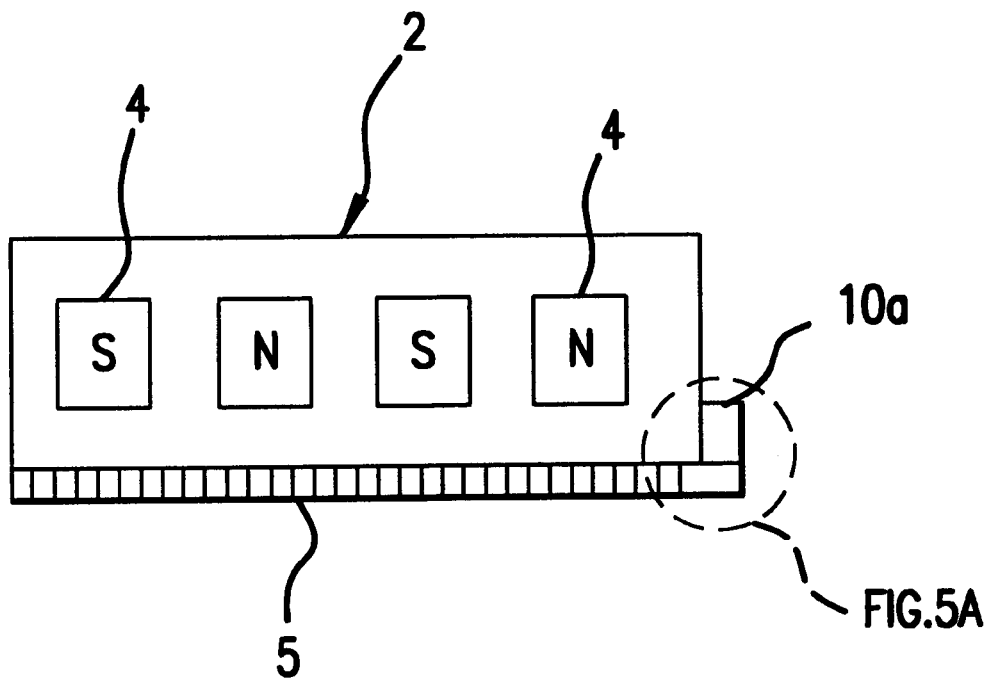
FIG. 5 illustrates an embodiment of a sensing magnet for a linear motor according to the present invention.
Figure 5A:
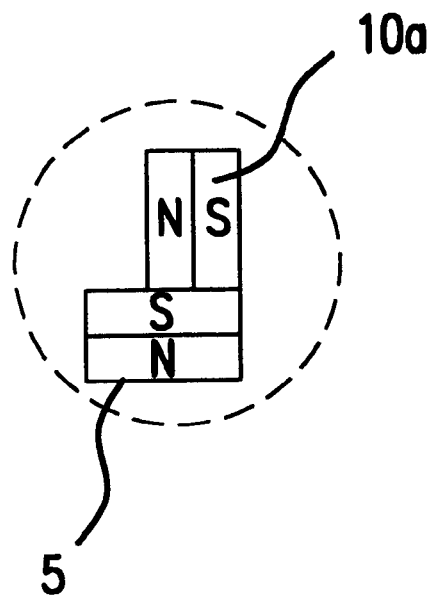

FIG. 5 shows another embodiment of the dummy sensing magnet 10 used for preventing malfunction of the switching circuit 20, and is a plane view showing embodiment of a sensing magnet for a linear motor according to the present invention.

As shown in the drawing, the dummy sensing magnet 10a is arranged perpendicular to one side of the sensing magnet 5. Namely, the dummy sensing magnet 10a is provided to face the permanent magnet 4 installed at the movable element 2, and the polarity arrangement thereof is such that the arrangement is identical with that of the permanent magnet 4.

In this case, with the dummy magnet's polarity arrangement identical with that of the permanent magnet 4, an introduction of magnet flux from the permanent magnet 4 into the Hall sensors H1 to H6 can be prevented, so that malfunction of the switching circuit 20 can be prevented. That is, while the polarity of the permanent magnet 4 is disposed in S an then N poles order, polarity of the dummy magnet 10a is also disposed in N and then S poles order.

With such an arrangement of the same polarities between the permanent magnet 4 and the dummy sensing magnet 10a being opposing to each other, malfunction of the Hall elements H1 to H6 due to the permanent magnets 4 can be prevented, and therefore malfunction of the switching circuit 20 can be prevented.

As described above, the present invention provides advantages in that malfunction of the switching circuit due to magnet flux from the permanent magnet mounted on the movable element can be prevented using the dummy sensing magnet, and the movable element light in weight can be designed accordingly.

We claim:

1. A linear motor including a stator element and a movable element, the motor comprising:

sensing magnets provided at a longitudinal one side of a movable element having a plurality of permanent magnets mounted thereon;

a plurality of Hall sensors mounted on the stator element and used for controlling current flow into a plurality of armature coils by turning on/off a switching circuit, based upon the sensing of magnet flux generated from the sensing magnets; and dummy sensing magnet provided at one side end of the sensing magnet in such a manner that its polarity is opposite to that of the sensing magnet, and for preventing magnets flux generated from the plural permanent magnets from introducing into the plural Hall sensors.

2. The motor as defined in claim 1, wherein said dummy sensing magnet comprises at least one or more magnets having S-pole and N-pole.

3. The motor as defined in claim 1, wherein said dummy sensing magnet is arranged perpendicular to one side of the sensing magnet.

* * * * *